Jan. 15, 1935.  J. F. CONNOR  1,987,846
GARDEN IMPLEMENT
Filed April 27, 1934
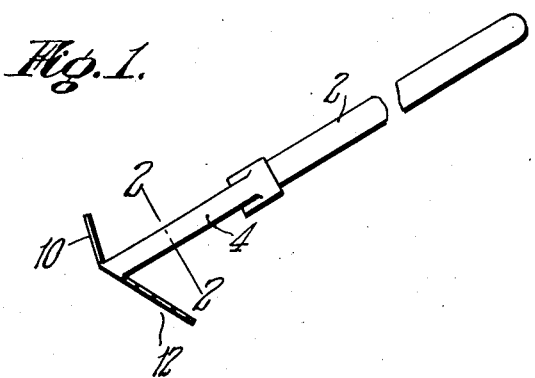
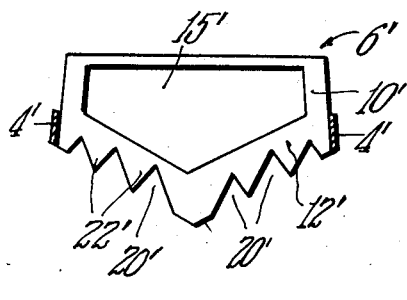
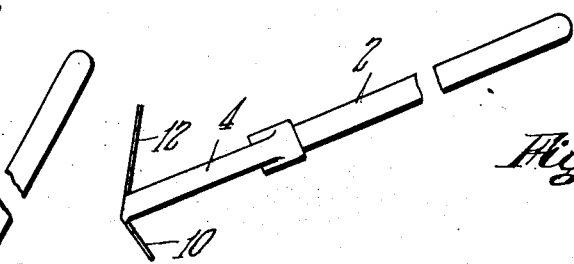
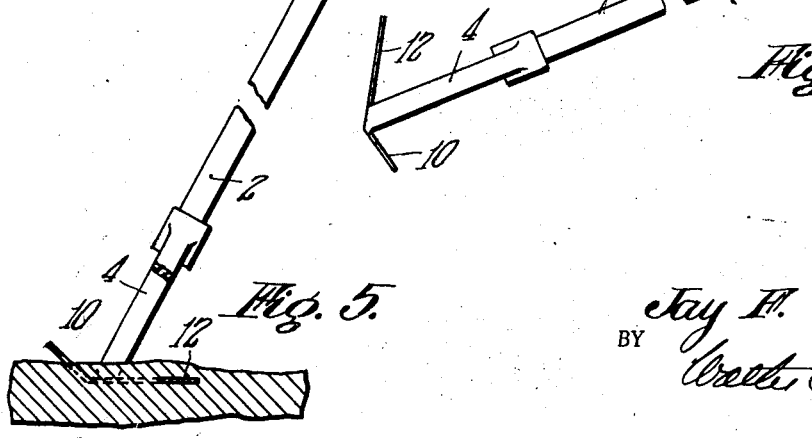
INVENTOR.
Jay F. Connor.
BY
ATTORNEY.

Patented Jan. 15, 1935

1,987,846

UNITED STATES PATENT OFFICE 1,987,846

GARDEN IMPLEMENT

Jay F. Connor, Wilbraham, Mass.

Application April 27, 1934, Serial No. 722,759

2 Claims. (Cl. 97—71)

This invention relates to improvements in garden implements and is directed more particularly to improvements in that type of garden implement which is used to cultivate the soil.

The invention has for its principal objects the provision of a novel implement which is adapted for many uses, but is more particularly adapted to serve the function of a cultivating tool which overcomes the disadvantages of prior art cultivators. The tool of this invention by reason of its novel construction is peculiarly adapted to get under the soil and dislodge it in such a way that the dust-mulch so valuable in conserving moisture for plant-life is discharged as is desirable and weeds and weed-seeds are destroyed.

Prior art garden-working tools have the disadvantageous characteristic of scraping the surface soil from one place to another, leaving some spots or places without any mulch. That is to say, it is desirable in cultivating operations that the surface of the ground be materially broken up and the surface soil be kept from packing hard around the plants and between the rows. This is because as is well known, the sun ever strives to draw moisture out of the ground and if the surface is relatively hard and baked and contact with the lower soil is not broken, the moisture in the ground, rising to the surface by capillary action, is withdrawn and evaporates into the atmosphere.

As stated, the tool of this invention is adapted to get under the soil and dislodge it in such a way that the dust-mulch is conserved. The implement of this invention breaks up the caked surface of the soil and discharges it in substantially the same place in which it lay before being disturbed.

Various other novel features and advantages of the invention will appear hereinafter in the accompanying description of the preferred form thereof, reference being had to the accompanying drawing wherein:

Fig. 1 is a side elevational view of the implement of the invention.

Fig. 2 is a sectional plan view on the line 2—2 of Fig. 1.

Fig. 3 is a view similar to Fig. 1 showing the device in a position different from that shown in Fig. 1.

Fig. 4 is a view similar to Fig. 2 showing a modified form of the invention, and Fig. 5 is a view similar to Fig. 1 with parts in section showing how the cultivator is used.

Referring now to the drawing more in detail, the invention will be fully described.

In Fig. 1, 2 represents a handle member. This handle preferably has downwardly depending arms 4 extending from its lower end. Associated with and carried by the arms 4 is the tool of the invention. Although the handle 2 may be connected directly to the tool, the arms 4, according to the preferred form of the invention, are connected at their lower ends to what may be called a plate member 6.

This plate member is preferably made of metal or some other relatively rigid material suitable for performing the functions of the invention. The plate is bent intermediate marginal side edges as shown to provide angularly disposed portions 10 and 12. For purposes of disclosure, the portion 10 may be called an upper portion and the portion 12 a lower portion, although, as will be seen, according to one way of operating the device, the portion 10 may be lowermost.

The plate member 6 is provided with a substantially centrally disposed aperture 15 which may extend through either or both of the angularly disposed portions 10 and 12. In any event, the opening 15 is disposed intermediate the forward marginal edges of the portion 12 and the rear edge of the portion 10 for purposes which will shortly appear.

According to the preferred form of the invention, one marginal edge of the portion 12, which henceforth for purposes of disclosure is referred to as the toothed working edge, is substantially V-shaped as shown. The aperture 15 is preferably so formed that its inner marginal edge adjacent the portion 12 approximates the shape of a V similar to the toothed edge of the part 12, substantially as shown.

The outer edge of the portion 12 is provided with what may be called a saw-tooth edge. That is to say, a plurality of grooves or notches 20 are provided therein and these are preferably so formed that tines or points 22 are formed. In this way, as the tool is drawn through the soil as shown in Fig. 5, the teeth lift up soil without violently displacing it and discharge it over the main body of the portion 12 through the aperture 15 where it again lies on the ground.

The other portion 10 of the plate member which, as stated, is angularly disposed relative to the portion 12, preferably has a substantially straight outer marginal edge, with the side marginal edges preferably converging inwardly or upwardly to the rear more or less, as shown in Figs. 1 and 5. In this way, the soil lifted by the toothed elements of the element 12 may not only be readily discharged through the opening 15 but may pass outwardly and over the sides of the portion 10. Also, of course, by virtue of the fact that the portion 10 is angularly disposed relative to the portion 12, the soil may strike against the upper body portion of the element 10 and slide downwardly thereon and through the aperture 15.

The opening 15 is preferably cut as close to the base of the grooves 20 as the strength of the material will allow. In this way, the principal novel function of the invention, that is getting under the soil, breaking it up into small lumps and quickly discharging it, is facilitated.

If desired, as shown in Fig. 4, a plate member 6' may be provided which is bent intermediate marginal side edges, as is plate 6, to have angularly disposed working elements 10' and 12', the latter having alternate grooves 20' and tines 22'. This plate has a relatively large aperture 15' formed by cutting the inner marginal edges of the working elements relatively closer to their outer marginal edges. In this way, the soil may be more readily discharged than is the case even with the form of the invention shown in Fig. 2.

When using the toothed working element of my implement, the plate member is so disposed relative to the ground that its working portion 12 is substantially horizontal as shown in Fig. 5. The tool is drawn towards the operator so that the soil is picked up by the teeth and discharged through the aperture.

If it is desired to chop the soil or dig trenches, for example, the tool may be reversed so that the substantially straight outer edge of the working element 10 is disposed at an angle to the soil as shown in Fig. 3. It may be seen that since the outer side of the portion 10 is more or less narrower than its innermost portion as shown in the drawing and since the side edges of it converge, the soil may readily pass thereover and thus the disadvantages of clogging are obviated.

As stated, the back or upper portion 10 of the tool is bent at an angle relative to the portion 12. Thus, when the tool is in its working position as shown in Fig. 5, the soil may readily be discharged through the aperture or over the sides and there is little likelihood of the soil's piling up. That is to say, the toothed elements get under the soil and lift it slightly and discharge it rearwardly and through the aperture as small lumps or particles of dust, commonly called dust-mulch.

As stated above, the handle member 2 may be connected directly to the plate member in some suitable manner. However, according to the preferred form of the invention the arms 4 are provided and they are attached to the sides of the plate member so as to eliminate the tendency for weeds, turf and other such material to be drawn along with the tool.

The portion 10 may be called a reinforcing bar portion. This is because, as shown, it connects the side portions of the V 12.

It is desired to point out that the handle and working parts of the tool of this invention are preferably disposed in substantially the angular relation shown and that such an arrangement and construction enables the operator to do more weeding and cultivating in less time and with less expenditure of energy than has been heretofore possible with prior art garden implements. The tool may be drawn between the plants with a steady pull or with a jerky motion all as may be desired and as the condition of the soil necessitates.

While I have described my invention in great detail and with respect to a preferred embodiment thereof, I do not desire to be limited to such detail or embodiment since many changes and modifications may be made without departing from the spirit and scope of the invention in its broader aspects. Hence, what I desire to claim as new and secure by Letters Patent of the United States is:

1. A tool of the class described for working soil comprising in combination, a plate member of sheet metal bent on a transverse line intermediate its ends providing angularly disposed end portions, the endmost marginal edge of one of said end portions formed to the shape of a V having the apex thereof disposed away from the said transverse line and provided with alternate notches and tines, the endmost marginal edge of the other of said end portions being straight and disposed substantially parallel to said transverse line of bending, the said plate member provided with a central opening therethrough having angularly disposed transverse edges spaced from and in substantial parallelism with the V-forming edge of said one end portion and another transverse edge spaced from and in substantial parallelism with said endmost straight edge of said other end portion providing in conjunction with said endmost marginal edges a V having side portions connected by a reinforcing bar portion around said opening, and a handle extending upwardly from said plate and immovable relative thereto, all adapted and arranged whereby the said one end portion of the plate having the V-shaped edge may be drawn through the ground below its surface to loosen the soil thereof so that the said soil passes over the said one end portion and through the said opening of the plate beneath said reinforcing bar which extends upwardly therefrom.

2. A tool of the class described for working soil comprising in combination, a plate member of sheet metal bent on a transverse line intermediate its ends to provide an end portion in the shape of a V having the sides thereof connected to a transverse reinforcing end portion providing an opening therebetween and the said end portions being disposed in planes at an angle relative to one another, the outer marginal edge of the first-named end portion being provided with alternate notches and tines and the outer marginal edge of the second-named end portion being disposed substantially transversely, and a handle extending upwardly from one of said end portions and immovable relative thereto, all adapted and arranged whereby the first-named end portion may be drawn through the soil below its surface in substantial parallelism therewith to cause the soil to pass over the said portion and through the said opening.

JAY F. CONNOR.